United States Patent
Touji et al.

[19]

[11] Patent Number: 6,034,838
[45] Date of Patent: Mar. 7, 2000

[54] MAGNETIC RECORDING/REPRODUCING DEVICE WITH AN IMPROVED CARRIAGE LOCATION DETECTOR

[75] Inventors: Hidetsugu Touji, Atsugi; Toshiharu Shimizu, Machida; Yoshihide Majima, Hadano, all of Japan

[73] Assignee: Mitsumi Electric Co., Ltd., Tokyo, Japan

[21] Appl. No.: 08/969,172

[22] Filed: Nov. 12, 1997

[30] Foreign Application Priority Data

Nov. 13, 1996 [JP] Japan .................................. 8-301949

[51] Int. Cl.[7] .......................... G11B 19/02; G11B 21/02; G11B 21/24
[52] U.S. Cl. ...................................... 360/78.11; 360/77.03
[58] Field of Search .................................. 360/75, 73.04, 360/74.6, 77.03, 78.01, 78.04, 78.11

[56] References Cited

U.S. PATENT DOCUMENTS 4,780,778  10/1988  Gunji et al. ............................ 360/109
5,235,477  8/1993  Inoue .......................................... 360/75
5,305,159  4/1994  Sakai et al. ............................ 360/77.02

FOREIGN PATENT DOCUMENTS

1-003515  1/1989  Japan .
8-235602  9/1996  Japan .

Primary Examiner—William J. Klimowicz
Attorney, Agent, or Firm—Frishauf, Holtz, Goodman, Langer & Chick, P.C.

[57] ABSTRACT

A carriage location detector comprises a scale formed on a carriage and having a plurality of slits at a predetermined interval, a photointerrupter including at least one light emitting element and a plurality of light receiving elements arranged opposite to each other with the scale interposed therebetween. The light receiving elements are so that output signals thereof have a phase difference of 90° from one another. A processing circuit is responsive to the output signals from the light emitting elements for carrying out processing, in an initial setting operation, so as to keep voltage waveforms of the output signals within a predetermined range.

2 Claims, 8 Drawing Sheets

MAGNETIC RECORDING/REPRODUCING DEVICE WITH AN IMPROVED CARRIAGE LOCATION DETECTOR

BACKGROUND OF THE INVENTION

This invention relates to a magnetic recording/reproducing device such as a flexible disk drive.

As is well known, a flexible disk drive is a magnetic recording/reproducing device for carrying out data recording and reproducing operations to and from a flexible disk (hereinafter called a magnetic disk). In recent years, large capacity, magnetic disks have been developed. A typical magnetic disk has a storage capacity on the order between 1 Mbyte and 2 Mbyte (hereinafter called a normal capacity). In contrast, a magnetic disk having a storage capacity as large as 128 Mbyte (hereinafter called a large capacity) has already been developed. Following such increase in capacity of the magnetic disk, development is also made of a magnetic disk drive for carrying out data recording and reproducing operations to and from the magnetic disk of a large capacity.

In the following description, a magnetic disk drive capable of carrying out data recording and reproducing operations to and from the large-capacity magnetic disk alone will be referred to as a high-density dedicated magnetic disk drive. On the other hand, a magnetic disk drive capable of carrying out data recording and reproducing operations to and from the normal-capacity magnetic disk alone will be called a normal-density dedicated magnetic disk drive. A magnetic disk drive capable of carrying out data recording and reproducing operations to and from both the large-capacity and the normal-capacity magnetic disks will be called a high-density/normal-density magnetic disk drive. The high-density dedicated magnetic disk drive and the high-density/normal-density magnetic disk drive may collectively be called a high-density magnetic disk drive.

The normal-density dedicated magnetic disk drive and the high-density magnetic disk drive are different in mechanism from each other. One of the major differences resides in a drive source for driving a carriage holding a magnetic head. The drive source is for moving the carriage with respect to the magnetic disk inserted in the magnetic disk drive in a predetermined radial direction of the magnetic disk. Specifically, the normal-density dedicated magnetic disk drive uses a stepping motor as the carriage drive source. The stepping motor has a rotation shaft with a lead screw. On the other hand, the high-density magnetic disk drive uses a linear motor such as a voice coil motor (VCM) as the carriage drive source.

Now, description will be made in detail as regards the voice coil motor used as the drive source in the high-density magnetic disk drive. The voice coil motor is arranged at a rear side of the carriage. The voice coil motor comprises a voice coil wound around a drive shaft extending in parallel to the predetermined radial direction, and a magnetic circuit for producing a magnetic field in a direction intersecting electric current flowing through the voice coil. The voice coil is movable along the drive shaft. The magnetic circuit comprises a permanent magnet. When the electric current is made to flow through the voice coil in a direction intersecting the magnetic field produced by the magnetic circuit, drive force is generated in the voice coil in an extending direction of the drive shaft as a result of interaction between the electric current and the magnetic field. By the drive force, the voice coil motor makes the carriage move in the predetermined radial direction.

As is well known, the magnetic disk includes a magnetic disk medium accessed by the magnetic head. On each surface of the magnetic disk medium, a large number of concentric tracks are formed in a radial direction to record data. As will readily be understood, the large-capacity magnetic disk has a track width and a track pitch smaller than those of the normal-capacity magnetic disk. The tracks are successively arranged from an outermost track (hereinafter depicted at Tr00) to an innermost track. The outermost track Tr00 will herein be called an endmost track. The normal-capacity magnetic disk has 80 tracks on each surface.

When the magnetic disk is accessed by the magnetic head, the magnetic head must be positioned at a desired track location. For this purpose, it is necessary and sufficient to position the carriage holding the magnetic head.

In the normal-density dedicated magnetic disk drive adopting the stepping motor as the drive source, positioning of the carriage is easily achieved. This is because the carriage is driven by the stepping motor to move stepwise by a predetermined distance at every pulse applied thereto. Thus, no special positioning means is required in addition to the stepping motor.

On the other hand, in the high-density/normal-density magnetic disk drive adopting the linear motor as the drive source, special positioning means is required to position the carriage if the normal-capacity magnetic disk is inserted therein. This is because the linear motor is responsive to the electric current flowing through the voice coil to freely move in the predetermined radial direction so that any control is required in order to stop such free movement. Positioning of the carriage requires a carriage location detector for detecting a current location of the carriage and a carriage location controller for controllably moving the carriage to a desired location with reference to the current location detected by the carriage location detector.

In case where the large-capacity magnetic disk is inserted in the high-density/normal-density magnetic disk drive, it is unnecessary to use the above-mentioned positioning means. This is because, in the large-capacity magnetic disk, a servo signal for location detection is preliminarily written on the magnetic disk medium.

As will later be described in detail, a conventional carriage location detector requires manual adjustment for an initial setting operation. Such manual adjustment is troublesome.

SUMMARY OF THE INVENTION:

It is therefore an object of this invention to provide a magnetic recording/reproducing device comprising a carriage location detector allowing easy adjustment for an initial setting operation.

A magnetic recording/reproducing device to which this invention is applicable comprises a carriage spaced from a main board and holding a magnetic head, a linear motor for moving the carriage in a predetermined radial direction of a magnetic recording medium, and a detector for detecting the location of the carriage.

According to an aspect of this invention, the detector comprises a scale formed on the carriage and having a plurality of slits arranged at a predetermined interval in the predetermined radial direction, a photointerrupter arranged on a subboard attached to the main board and including at least one light emitting element and a plurality of light receiving elements arranged opposite to each other with the scale interposed therebetween, said light receiving elements being arranged so that output signals thereof have a phase difference of 90° from one another, and a processing circuit responsive to the output signals from the light receiving elements for carrying out processing, in an initial setting operation, to keep voltage waveforms of the output signals within a predetermined range.

Figure 1:
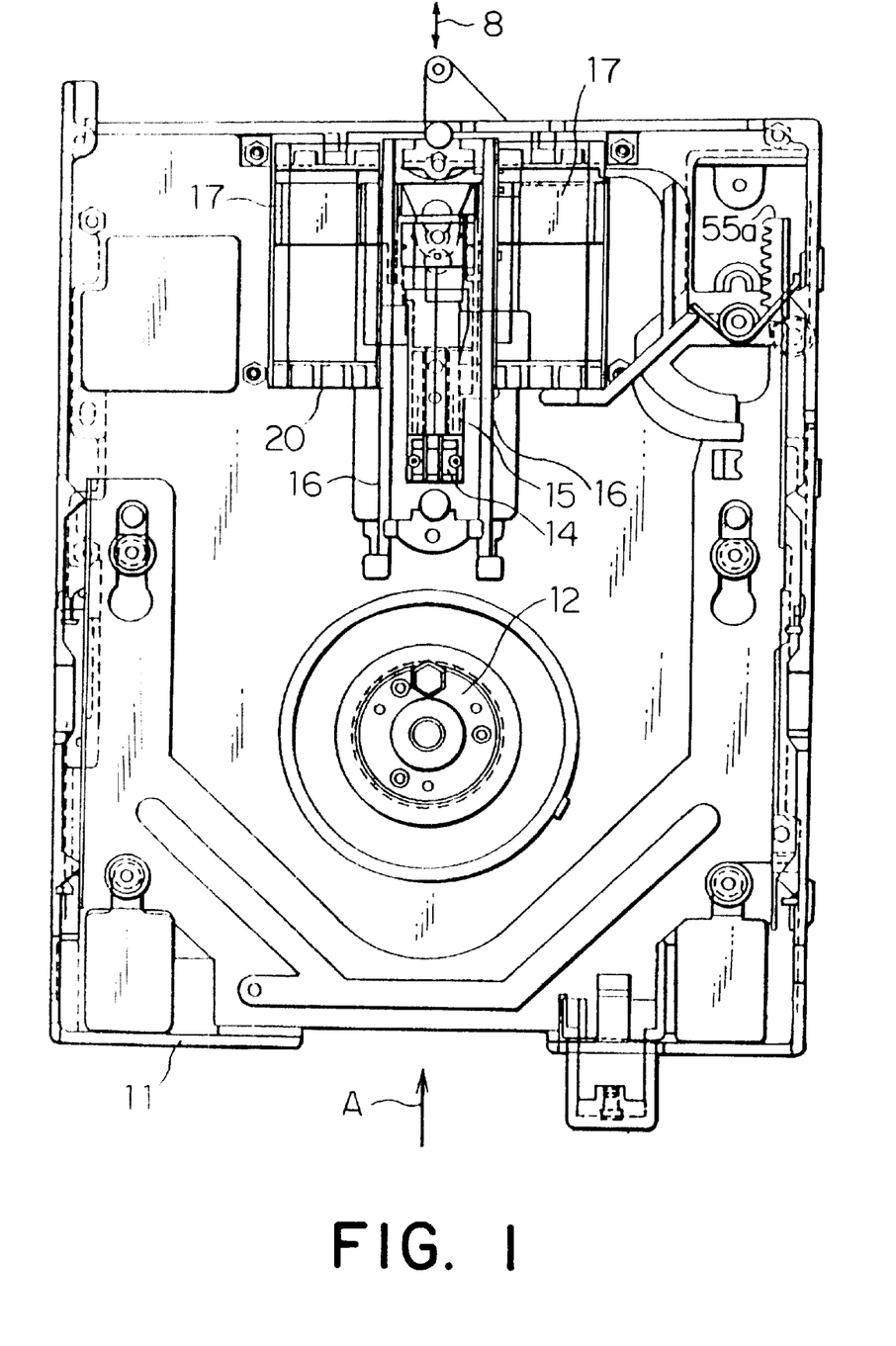
FIG. 1 is a plan view of a magnetic disk drive with a carriage location detector to which this invention is applicable.

DESCRIPTION OF THE PREFERRED EMBODIMENT:

Referring to FIG. 1, description will be made about a magnetic disk drive with a carriage location detector. A magnetic disk is inserted into the magnetic disk drive in a direction depicted at A in FIG. 1.

On a principal surface of the main board 11, a disk table assembly 12 is rotatably supported. The magnetic disk inserted is held on the disk table assembly 12. The disk table assembly 12 is rotated by a drive motor (not shown) formed on a rear surface of the main board 11. The rotation of the disk table assembly 12 provides the rotation of the magnetic disk. To the rear surface of the main board 11, a printed wiring board (not shown) with a number of electronic components mounted thereon is attached.

The magnetic disk drive comprises a magnetic head for writing and reading data into and from the magnetic disk. The magnetic head is held through a gimbal 14 on a carriage 15. A combination of the magnetic head, the gimbal 14, and the carriage 15 will be called a carriage assembly. The carriage 15 is arranged above the principal surface of the main board 11 with a space kept from the main board 11. The carriage 15 holds the magnetic head so that the magnetic head is movable in a predetermined radial direction (depicted by an arrow B in FIG. 1) of the magnetic disk.

The carriage 15 is supported at lower ends of both sides thereof on a pair of guide bars 16 extending in parallel to the predetermined radial direction B and is guided thereby.

The carriage 15 is driven in the predetermined radial direction B by a voice coil motor which will hereinafter be described. Specifically, the voice coil motor is arranged at a rear side of the carriage 15. The voice coil motor comprises a pair of voice coils 17 each of which is wound around a drive shaft extending in parallel to the predetermined radial direction B, and a magnetic circuit 20 for generating a magnetic field in a direction intersecting electric current flowing through the voice coils 17. Each voice coil 17 is movable along the drive shaft. The magnetic circuit 20 includes a permanent magnet. In the voice coil motor having the above-mentioned structure, let the electric current flow through the voice coils 17 in a direction intersecting the magnetic field generated by the magnetic circuit 20. In this event, drive force is generated in the voice coils 17 in an extending direction of the drive shafts as a result of interaction between the electric current and the magnetic field. By the drive force, the voice coil motor makes the carriage 15 move in the predetermined radial direction B.

Figure 2A:
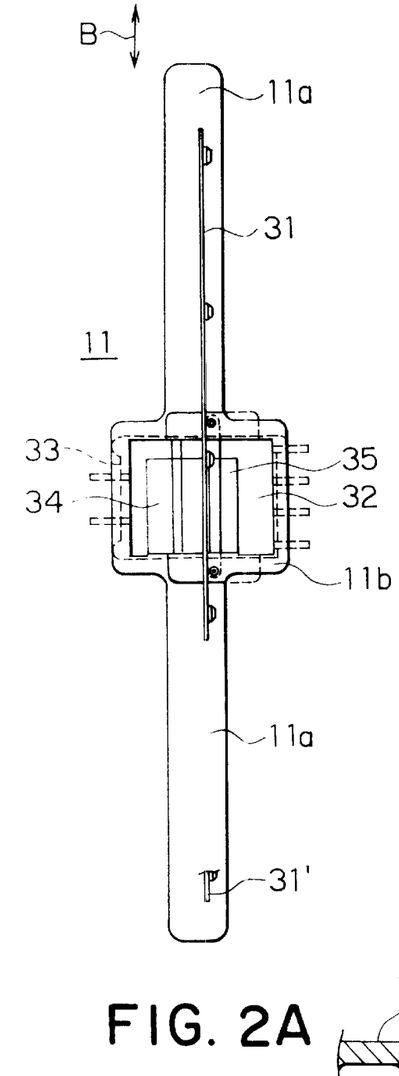
FIGS. 2A through 2C are a plan view, a right side sectional view, and a rear sectional view, respectively, for describing a mechanical structure of the carriage location detector illustrated in FIG. 1.
Figure 2B:
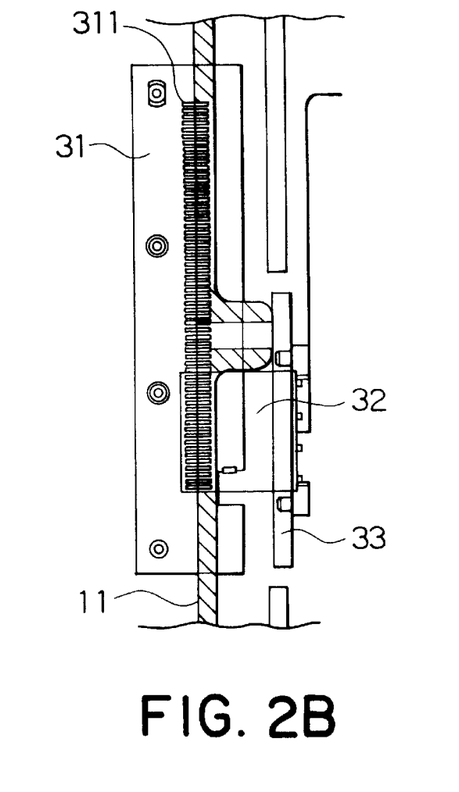
Figure 2C:
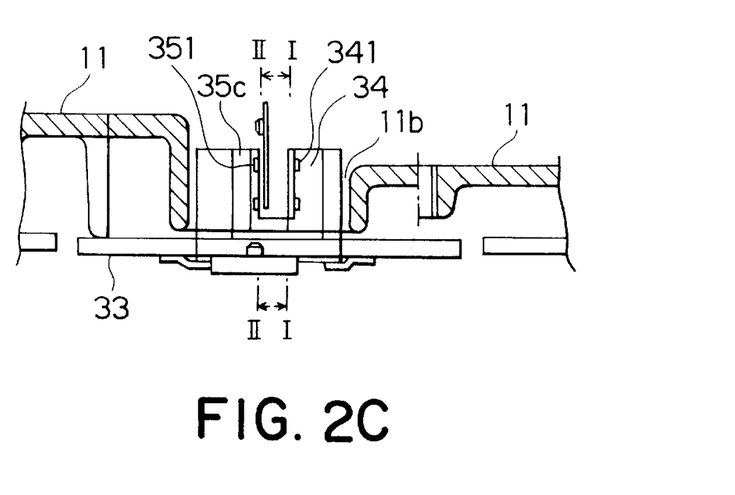

FIGS. 2A through 2C shows a carriage location detector to which this invention is applicable. The carriage location detector comprises a scale 31 fixed to the carriage 15 (FIG. 1) holding the magnetic head, and a photointerrupter 32. The photointerrupter 32 is arranged on a subboard 33 attached to the main board 11. The scale 31 extends in parallel to the predetermined radial direction B and along a plane perpendicular to the main board 11. The scale 31 comprises an opaque member which does not transmit light. The scale 31 has a large number of slits 311 formed at a predetermined interval in the predetermined radial direction B for detection of a carriage location.

As illustrated in FIG. 2A, the main board 11 is provided with an opening 11a for insertion of a lower portion of the scale 31, and another opening 11b for passage of a head of the photointerrupter 32. The opening 11a allows the movement of the scale 31 in the predetermined radial direction B. On the other hand, the opening 11b allows the movement of the photointerrupter 31 in the predetermined radial direction B and enables alignment control for the photointerrupter 32. As illustrated in FIG. 2C, the opening 11b allows the movement of the photointerrupter 32 not only in the predetermined radial direction B but also in a direction perpendicular to the predetermined radial direction B. To this end, the opening 11b is sufficiently greater in size than the photointerrupter 32.

FIG. 2A shows a state where the magnetic head held by the carriage is positioned at the endmost track Tr00 of the magnetic disk medium. In this event, the scale 31 is movable between a location corresponding to the endmost track Tr00 and another location depicted at 31' in FIG. 2A. The location 31' corresponds to the innermost track of the magnetic disk medium. The number of the slits 311 must be a number such that a moving range of the carriage is completely covered.

The photointerrupter 32 comprises a light emitter 34 and a light receiver 35 arranged opposite to each other with the scale 31 interposed therebetween.

Figure 3A:
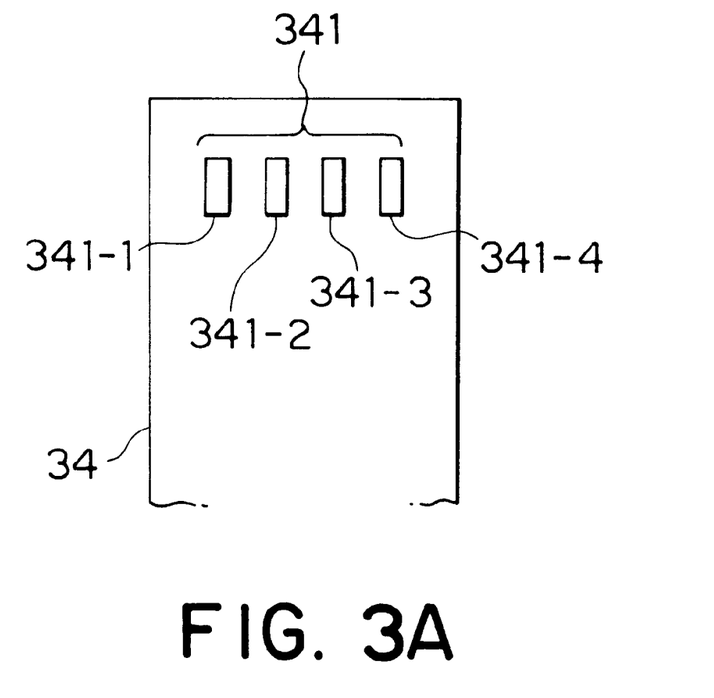
FIGS. 3A and 3B are sectional views taken along a line I—I and a line II—II in FIG. 2C, respectively.
Figure 3B:
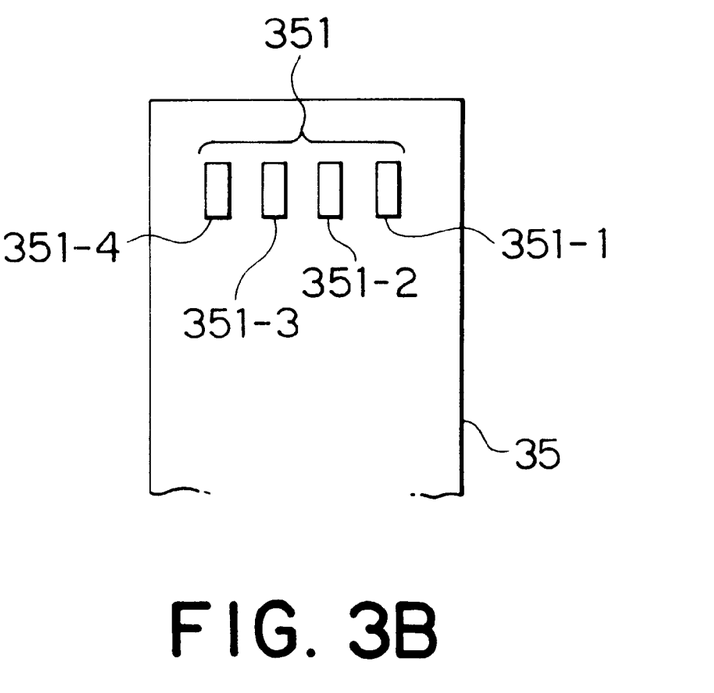

FIG. 3A shows the structure of the light emitter 34 while FIG. 3B shows the structure of the light receiver 35. The light emitter 34 and the light receiver 35 include a light emitting portion 341 and a light receiving portion 351 each of which is formed at a location corresponding to the slits 311.

In the example being illustrated, the light emitting portion 341 comprises first through fourth light emitting elements 341-1 through 341-4. On the other hand, the light receiving portion 351 comprises first through fourth light receiving elements 351-1 through 351-4 arranged opposite to the first through the fourth light emitting elements 341-1 through 341-4, respectively. Each light emitting element is implemented by a light emitting diode while each light receiving element is implemented by a phototransistor. The first through the fourth light emitting elements 341-1 through 341-4 are successively arranged in the predetermined radial direction B. The first through the fourth light receiving elements 351-1 through 351-4 are arranged at an interval selected so that output signals thereof have a phase difference of 90° from one another. The light emitting portion 341 may comprise a single light emitting element.

Figures 4A, 4B:
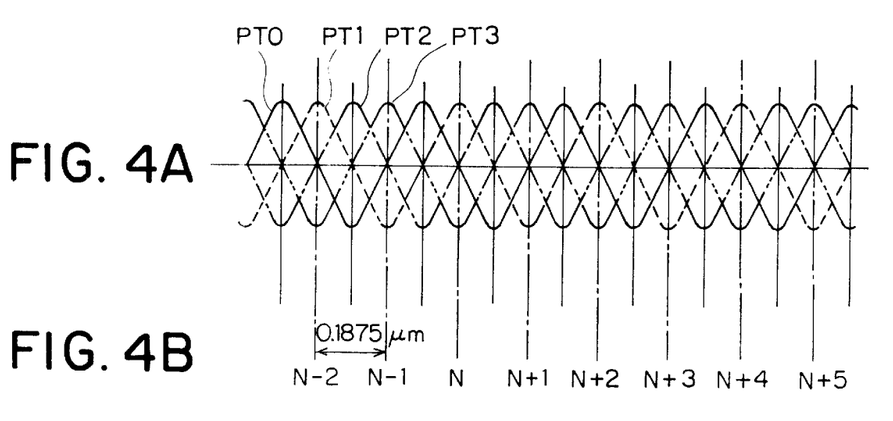
FIGS. 4A and 4B are views for describing output signals of the carriage location detector illustrated in FIGS. 2A through 2C.

Referring to FIGS. 4A and 4B, description will be made about the relationship between track locations (carriage locations) and the output signals of the first through the fourth light receiving elements 351-1 through 351-4. FIG. 4A shows the output signals PT0 through PT3 produced by the first through the fourth light receiving elements 351-1 through 351-4, respectively, while FIG. 4B shows the track locations (track numbers). As is obvious from FIG. 4A, the output signals PT0 through PT3 of the first through the fourth light receiving elements 351-1 through 351-4 have a phase difference of 90° from one another. It is thus possible to detect a moving direction of the carriage 15 (FIG. 1).

In the carriage location detector having the above-mentioned structure, a light beam emitted from the light emitting portion 341 of the photointerrupter 32 is received by the light receiving portion 351 of the photointerrupter 32 through the slits 311 of the scale 31. Therefore, by counting the number of presence or absence of light reception at the light receiving portion 351, the current location of the carriage 5 can be detected.

In the carriage location detector described above, an initial setting operation is carried out at the time of completion of a manufacturing process. For example, the initial setting operation is carried out in the following manner. Specifically, voltage waveforms (amplitudes) of the output signals PT0 through PT3 produced by the first through the fourth light receiving elements 351-1 through 351-4 are controllably kept within a predetermined range (2.25±1.25V). Such operation is realized by the use of a processing circuit illustrated in FIG. 5 through a series of steps illustrated in FIG. 6.

Figure 5:
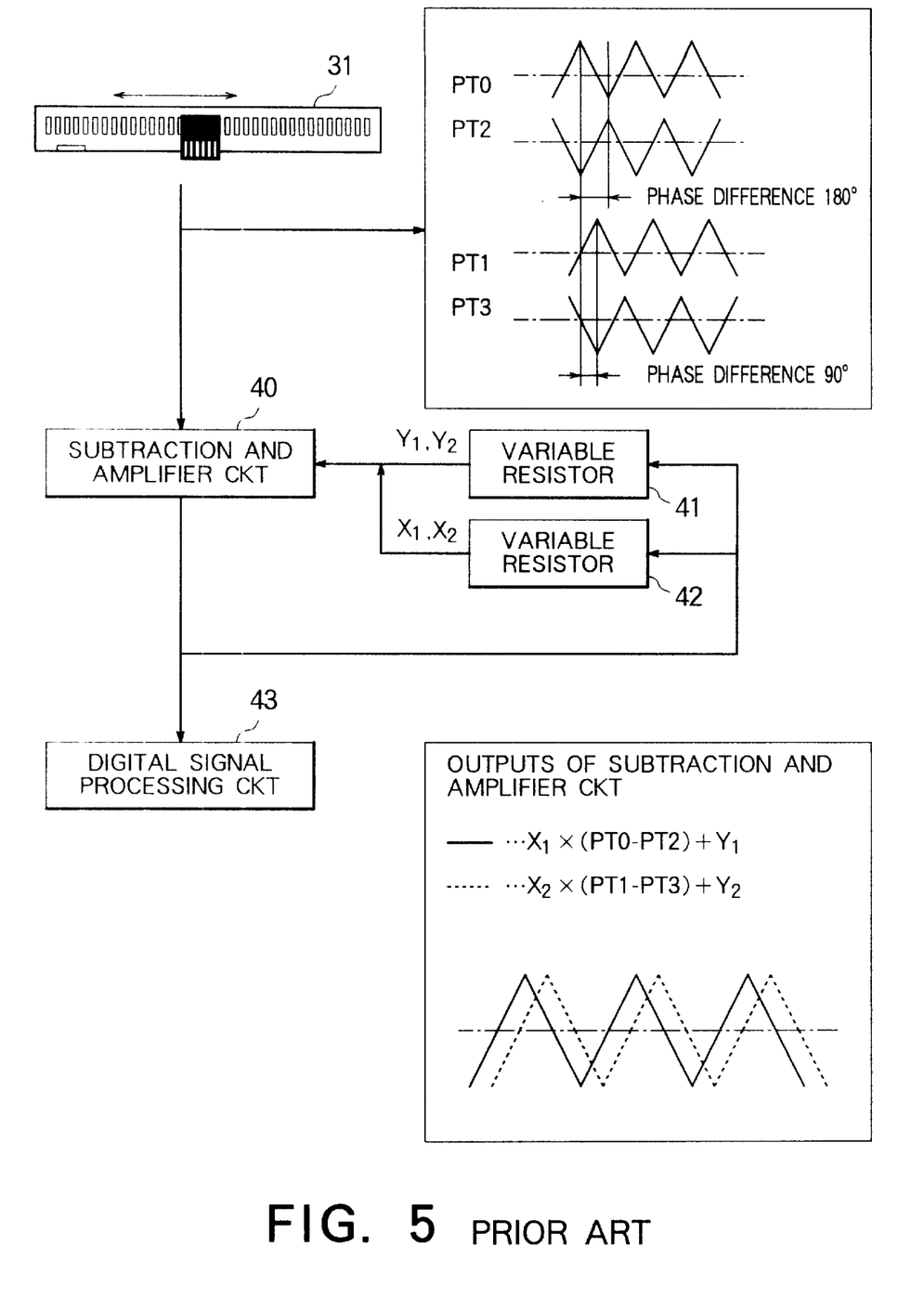
FIG. 5 is a view showing an electrical structure required in an initial setting operation in a conventional carriage location detector.

Referring to FIG. 5, the processing circuit comprises a subtraction and amplifier circuit 40 and variable resistors 41 and 42 connected thereto. The variable resistor 41 serves to control an offset for the waveforms of the output signals PT0 through PT3 while the variable resistor 42 serves to control a gain of the subtraction and amplifier circuit 40. The subtraction and amplifier circuit 40 is responsive to the output signals PT0 through PT3 and carries out arithmetic operations represented by:

$$X_1 \times (PT0-PT2)+Y_1$$

and $$X_2 \times (PT1-PT3)+Y_2,$$

where PT0 through PT3 represent the amplitudes of the output signals PT0 through PT3, respectively, and $X_1$, $X_2$, $Y_1$, and $Y_2$ represent arithmetic coefficients. The arithmetic coefficients $Y_1$ and $Y_2$ are set by the variable resistor 41 while the arithmetic coefficients $X_1$ and $X_2$ are set by the variable resistor 42. After setting these arithmetic coefficients, the subtraction and amplifier circuit 40 produces an output which is delivered to a digital signal processing circuit 43. The digital signal processing circuit 43 produces a location control signal to be supplied to a carriage location controller.

Figure 6:
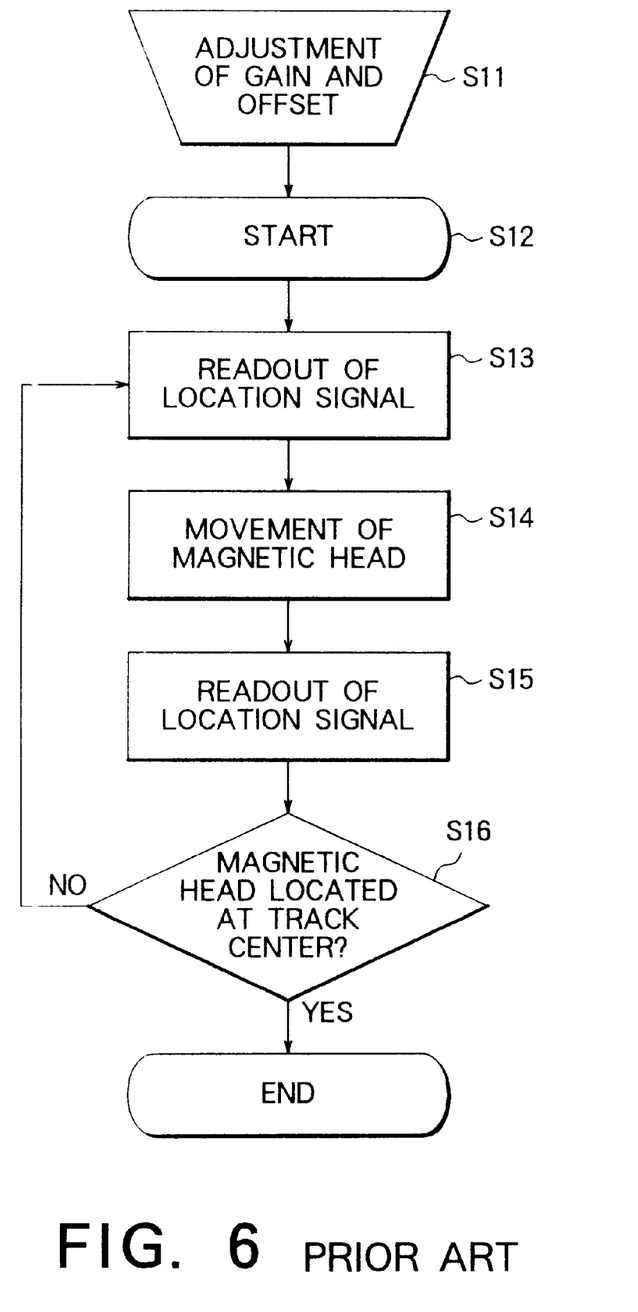
FIG. 6 is flow chart for describing an operation of the conventional carriage location detector illustrated in FIG. 5.

Referring to FIG. 6, in a step S11, the gain of the subtraction and amplifier circuit 40 and the offset are adjusted in the above-mentioned manner. Thereafter, a positioning operation is carried out to position the magnetic head at a track center by the use of the carriage location controller. The positioning operation is started in a step S12. In a step S13, the digital signal processing circuit 43 reads a location signal from the output of the subtraction and amplifier circuit 40. In a step S14, the carriage location controller is responsive to the location signal and moves the magnetic head to a selected track center. In a step S15, the location signal is read again. In a step S16, judgement is made about whether or not the magnetic head is positioned at the selected track center. If the magnetic head is out of the selected track center, the operation returns to the step S13. If the magnetic head is positioned at the selected track center in the step S16, the operation comes to an end.

As described above, in the conventional carriage location detector, the voltage waveform of the output signals PT0 through PT3 are adjusted to be kept within the range of (2.25±1.25) (V) by means of the two variable resistors 41 and 42 prior to the positioning operation of the magnetic head. However, the voltage waveforms may sometimes be deformed after completion of the above-mentioned adjustment due to various factors such as variation in source voltage and deterioration of the light receiving elements. In this event, the location signal obtained in the above-mentioned manner becomes inappropriate. In such instance, the voltage waveforms of the output signals PT0 through PT3 must be adjusted again to be kept within the range of (2.25±1.25) (V) by the use of the two variable resistors 41 and 42.

Figure 7:
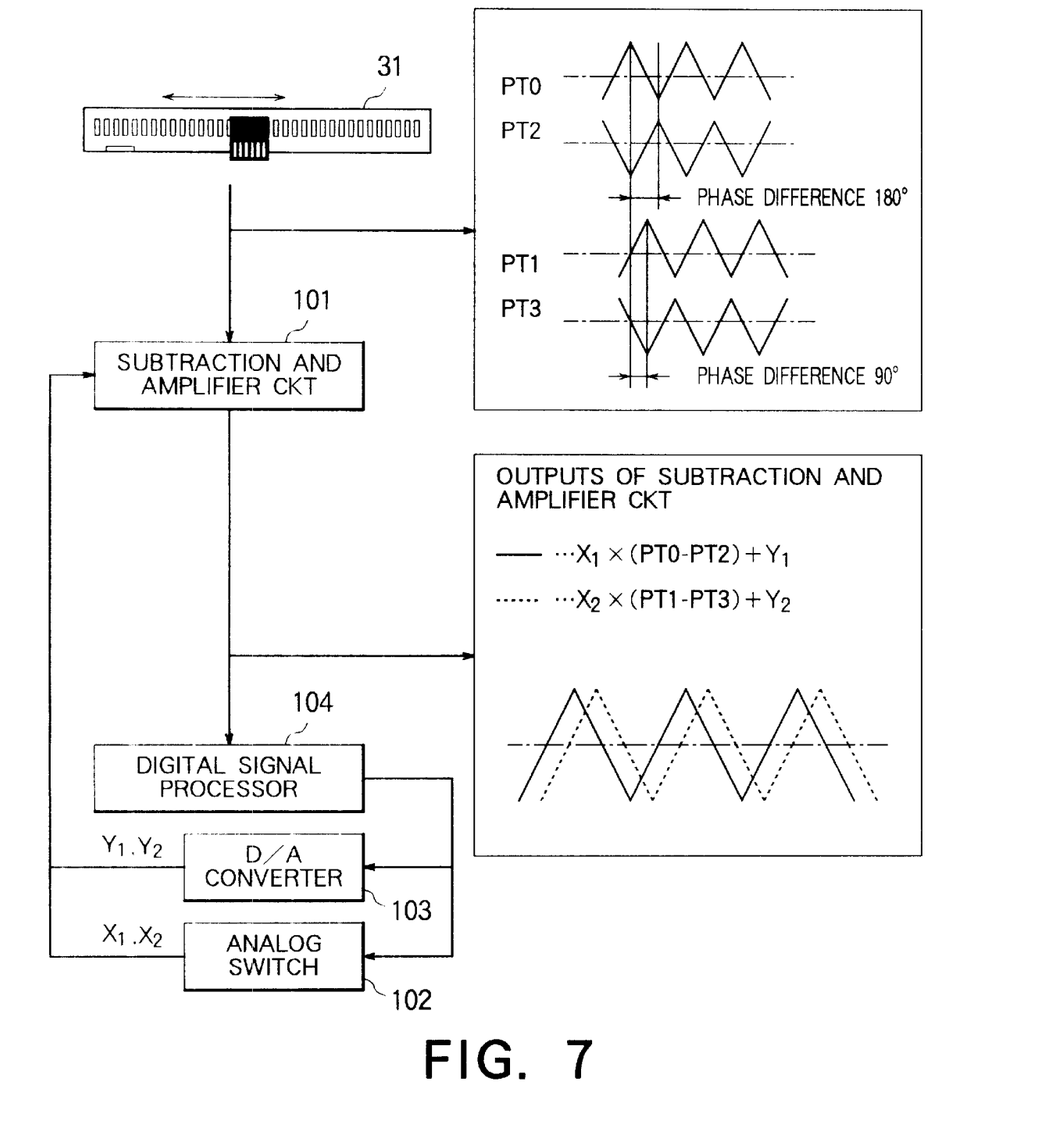
FIG. 7 is a view for describing an electrical structure of a carriage location detector according to a preferred embodiment of this invention.
Figure 8:
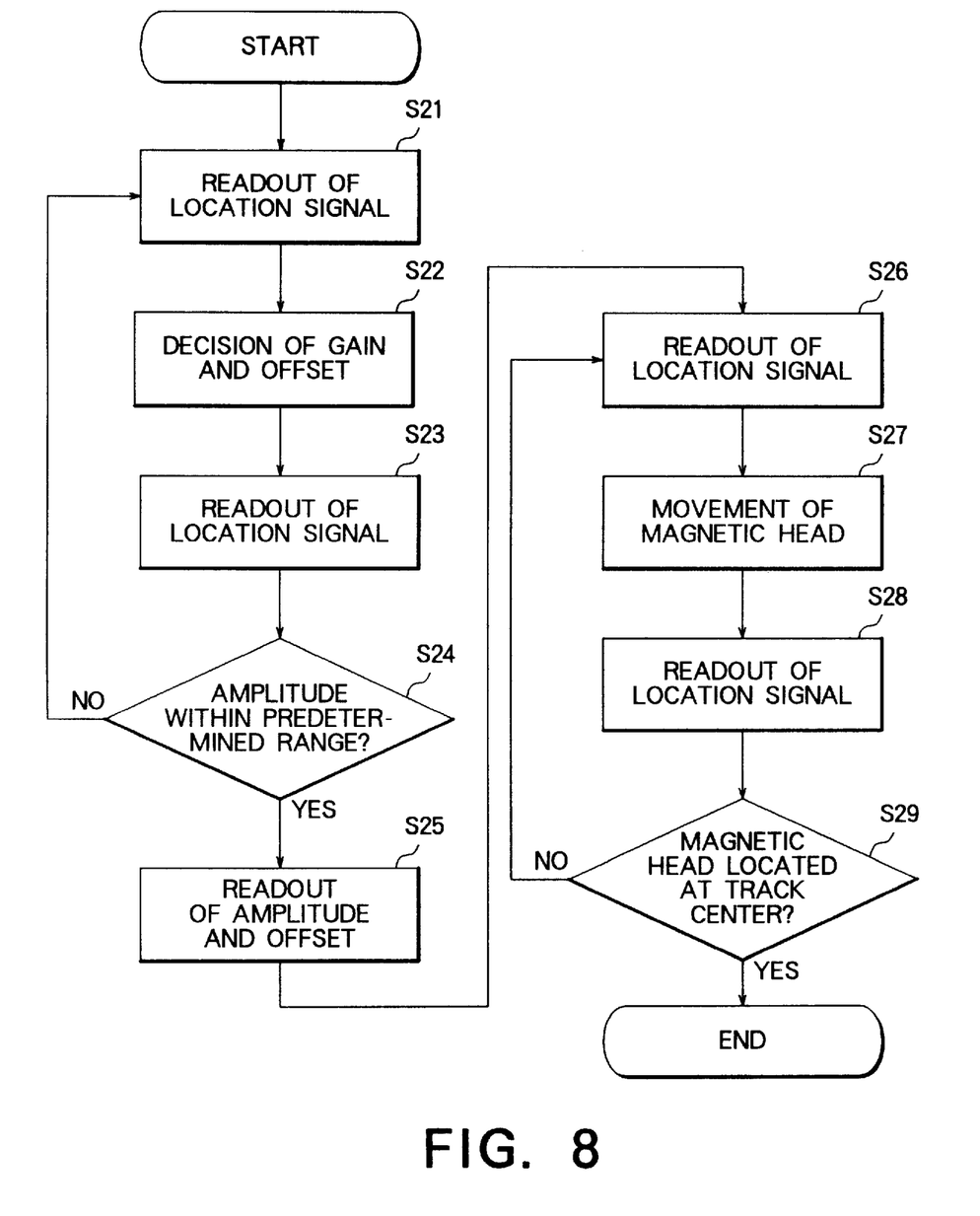
FIG. 8 is a flow chart for describing an operation of the carriage location detector illustrated in FIG. 7.

Referring to FIGS. 7 and 8, description will be made about a carriage location detector according to a preferred embodiment of this invention. Referring to FIG. 7, this embodiment is characterized by a processing circuit responsive to the output signals PT0 through PT3 delivered from the light receiving elements 351-1 through 351-4 described in conjunction with FIG. 3 for automatically carrying out processing such that the voltage waveforms (amplitudes) of the output signals PT0 through PT3 are kept within the predetermined voltage range.

The processing circuit comprises a subtraction and amplifier circuit 101 for carrying out subtraction between amplitudes of two output signals PT0 and PT2 having a phase difference of 180° from each other and between the like output signals PT1 and PT3 as described in conjunction with FIG. 5 and amplifying the results of subtraction, an analog switch 102 for adjusting (herein, 4 levels) a gain of the subtraction and amplifier circuit 101, and a D/A converter for adjusting the offset of the subtraction and amplifier circuit 101. The processing circuit further comprises a digital signal processor 104 responsive to the output of the subtraction and amplifier circuit 101 and carries out predetermined processing to produce a gain adjustment control signal to be supplied to the analog switch 102 and an offset adjustment control signal to be supplied to the D/A converter 103.

As described in conjunction with FIG. 5, the subtraction and amplifier circuit 101 is responsive to the output signals PT0 through PT3 and carries out arithmetic operations represented by:

$$X_1 \times (PT0-PT2)+Y_1$$

and $$X_2 \times (PT1-PT3)+Y_2,$$

where PT0 through PT3 represent the amplitudes of the output signals PT0 through PT3, respectively. The digital signal processor 104 determines arithmetic coefficients $X_1$, $X_2$, $Y_1$, and $Y_2$ required to keep the waveforms (amplitudes) of the output signals PT0 through PT3 within a predetermined range of (2.25±1.25V). The digital signal processor 104 produces the gain adjustment control signal and the offset adjustment control signal so that the analog switch 102 and the D/A converter 103 produce the arithmetic coefficients $X_1$, $X_2$, $Y_1$, and $Y_2$.

Referring to FIG. 8, an initial setting operation at the time of completion of a manufacturing process is carried out. In a step S21, a current location signal is read from the output signals PT0 through PT3. This reading operation can be carried out at any position on the scale as far as the waveforms (amplitudes) of the output signals PT0 through PT3 are detected. In a step S22, the digital signal processor 104 is responsive to the location signal thus read and determined the gain and the offset to produce the gain adjustment control signal and the offset adjustment control signal to be supplied to the analog switch 102 and the D/A converter 103, respectively. After adjustment of the gain and the offset, the location signal is again read in a step S23. In a step S24, the digital signal processor 104 judges whether or not the waveforms (amplitudes) of the output signals PT0 through PT3 are kept within the predetermined range of (2.25±1.25V). If the waveforms of the output signals PT0 through PT3 are kept within the predetermined range, the operation proceeds to a step S25. On the other hand, if the waveforms of the output signals PT0 through PT3 are not kept within the predetermined range, the operation returns to the step S21 to repeat the abovementioned operation until the waveforms of the output signals PT0 through PT3 are kept within the predetermined range.

The operation according to this embodiment comprises the above-mentioned steps. In the step S25 and subsequent steps, a positioning operation of positioning the magnetic head at the track center is carried out as described in conjunction with FIG. 6. Specifically, in the step S25, a reading operation is carried out to read the amplitudes of the output signals PT0 through PT3 obtained as mentioned above as well as the gain and the offset of the subtraction and amplifier circuit 101. In the subsequent steps, the positioning operation is carried out to position the magnetic head at the track center by the use of the carriage location controller. When the positioning operation is started, the location signal is read from the output of the subtraction and amplifier circuit 101 (step S26). The carriage location controller is responsive to the location signal and moves the magnetic head to a selected track center with the amplitude and the voltage read in the step S25 used as reference values (step S27). In a step S28, the location signal is read again. In a step S29, judgement is made about whether or not the magnetic head is positioned at the selected track center. If the magnetic head is out of the selected track center, the operation returns to the step S26. On the other hand, if the magnetic head is positioned at the selected track center, the operation comes to an end.

As described above, according to this invention, no manual adjustment by the variable resistors is necessary in the initial setting operation. The digital signal processor 104 performs automatic adjustment so as to correct or compensate the deviation in amplitude of the output signals or in offset due to deterioration of the light emitting elements and the light receiving elements. In addition, the deviation in amplitude and in offset due to fluctuation (1.5–4.5%) of an interrupter conversion efficiency can also be compensated.

It will readily be understood that this invention is not restricted to the foregoing embodiment but can be modified in various other manners within the scope of this invention. For example, the carriage location detector according to this invention is not only applicable to the high-density/normal-density magnetic disk drive but also to any magnetic recording/reproducing device of the type such that the carriage is driven by the linear motor. The foregoing embodiment is directed to the case where the scale comprises the opaque member which does not transmit light. However, the scale may comprise a transparent or light transmissible member. In this event, the slits can be formed by adhering opaque thin pieces to the scale.

What is claimed is:

1. A magnetic recording/reproducing device comprising a carriage spaced from a main board and holding a magnetic head, a linear motor arranged to move said carriage in a predetermined radial direction of a magnetic recording medium, and a detector which detects the location of said carriage, wherein said detector comprises:

a scale formed on said carriage and having a plurality of slits at a predetermined interval in said predetermined radial direction;

a photointerrupter arranged on a subboard attached to said main board and including at least one light emitting element and a plurality of light receiving elements arranged opposite to each other with said scale interposed therebetween, said light receiving elements being arranged so that output signals thereof have a phase difference of 90° from one another; and a processing circuit responsive to said output signals from said light receiving elements for carrying out processing, in an initial setting operation, to keep voltage waveforms of said output signals within a predetermined range; and wherein said processing circuit comprises:

an amplifier circuit which is responsive to, among said output signals, first and second pairs of output signals, such that the output signals in each pair have a phase difference of 180°, wherein said amplifier circuit performs subtraction between amplitudes of the output signals in said first pair and between amplitudes of the output signals in said second pair, and wherein said amplifier circuit performs amplification of the results of the subtraction;

an analog switch for adjusting a gain of said amplifier circuit;

a D/A converter for adjusting an offset of said amplifier circuit; and a digital signal processor responsive to an output of said amplifier circuit for carrying out predetermined processing to produce a gain adjustment control signal and an offset adjustment control signal to be supplied to said analog switch and said D/A converter, respectively.

2. A magnetic recording/reproducing device as claimed in claim 1, wherein said photointerrupter comprises:

first, second, third and fourth light emitting elements; and first, second, third and fourth light receiving elements arranged opposite to said first, second, third and said fourth light emitting elements, respectively.

* * * * *